June 17, 1947.      B. S. HARRINGTON      2,422,194
METHOD AND APPARATUS FOR COLLECTION AND TREATMENT OF BLOOD
Filed Jan. 20, 1943      4 Sheets-Sheet 1
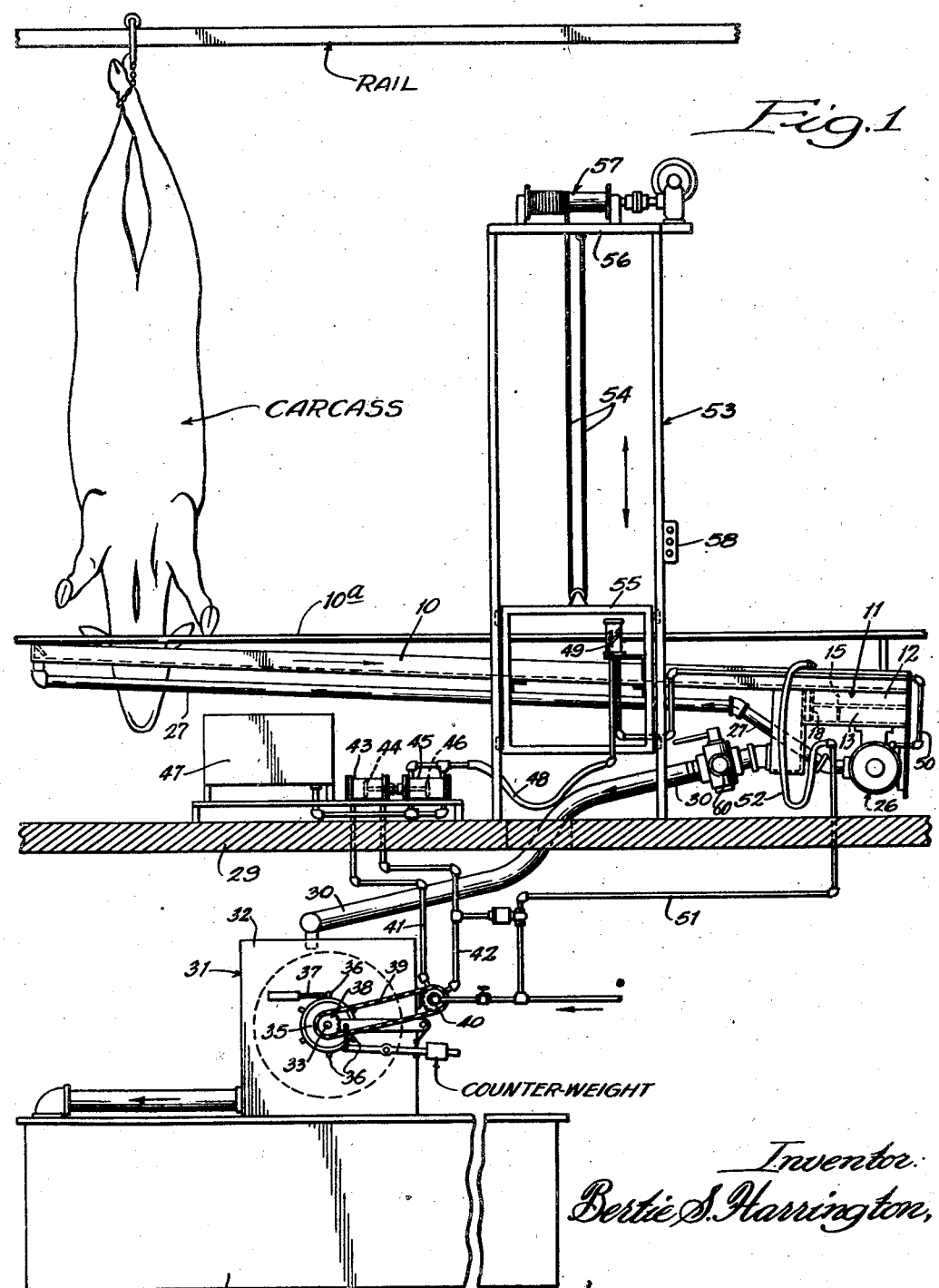

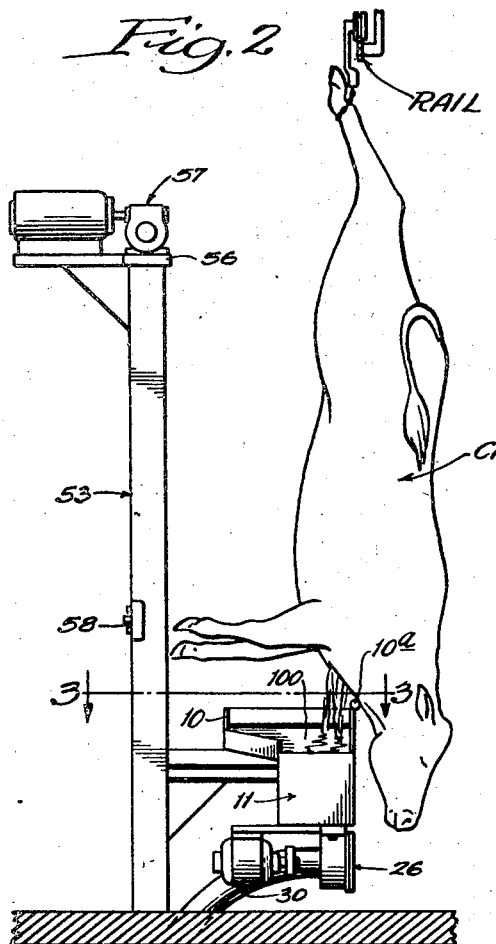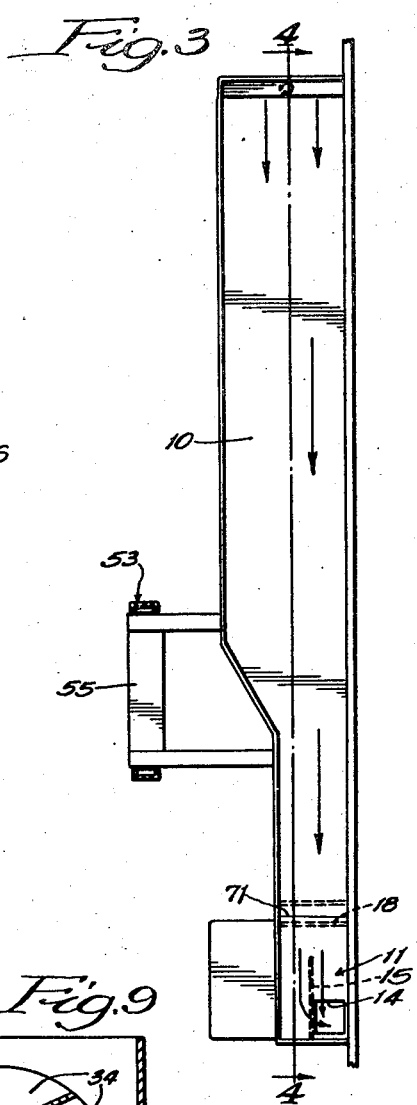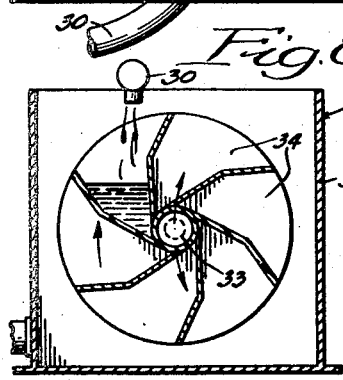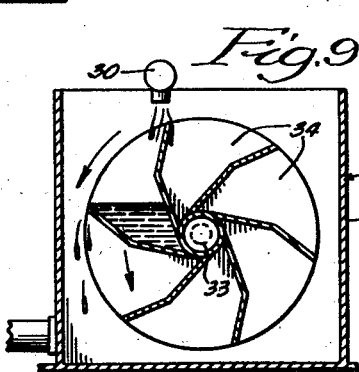

June 17, 1947.  B. S. HARRINGTON  2,422,194
METHOD AND APPARATUS FOR COLLECTION AND TREATMENT OF BLOOD
Filed Jan. 20, 1943  4 Sheets-Sheet 3
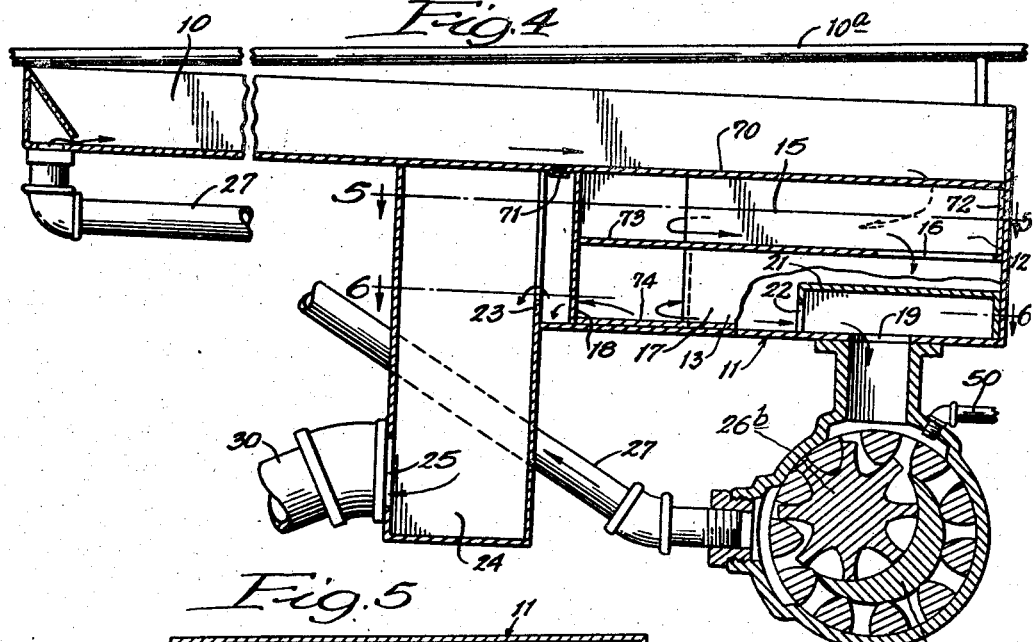
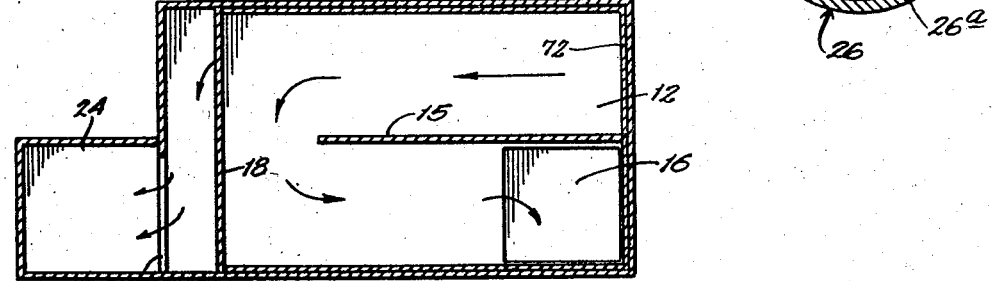
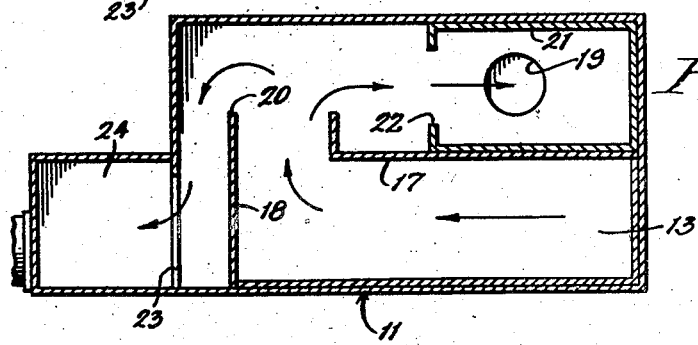
Inventor.
Bertie S. Harrington,
By Carl C. Batz
Attorney.

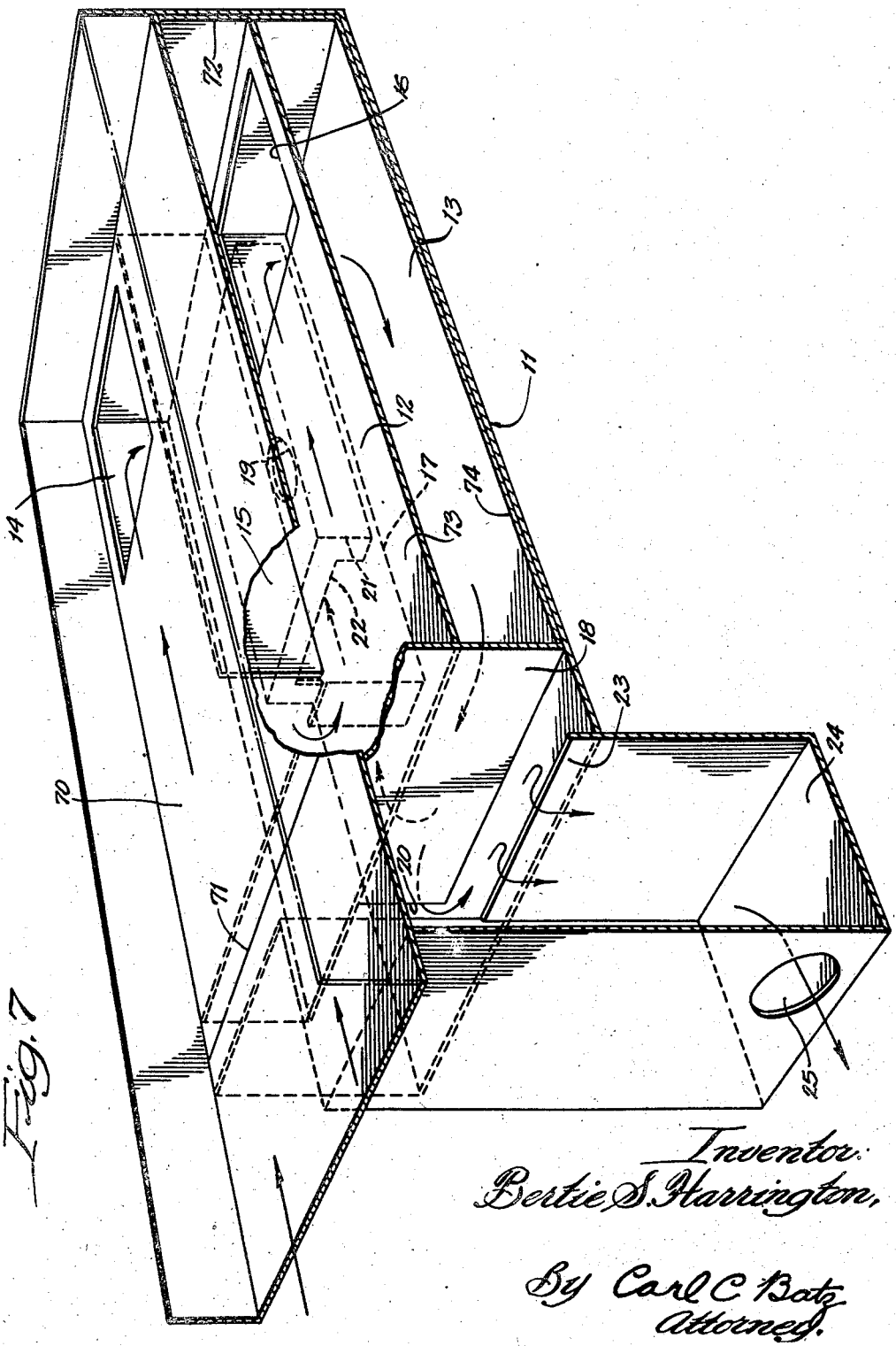

Patented June 17, 1947

2,422,194

UNITED STATES PATENT OFFICE 2,422,194

METHOD AND APPARATUS FOR COLLECTION AND TREATMENT OF BLOOD

Bertie S. Harrington, Chicago, Ill., assignor to Armour and Company, Chicago, Ill., a corporation of Illinois Application January 20, 1943, Serial No. 473,024

31 Claims. (Cl. 99—21)

This invention relates to the collection and treatment of blood. More particularly it pertains to an improved method and novel apparatus for collecting and treating blood drained from animals as they are slaughtered in the course of packing house operations.

In the slaughtering of animals such as cattle, hogs, etc., to prepare meat therefrom, the animals are customarily stuck at the throat to sever veins and arteries so that the blood drains from the animal's body. In the case of cattle, the usual practice is to first stun the animals by a blow on the head and then suspend them by their hind legs, in which condition they are moved by a conveyor to a position where they are stuck, sometimes at a rate of about three animals per minute. In a common sticking procedure for cattle, a knife is thrust into the animal's neck and the hide slit. Then the wound is made deeper, and by a turn of the knife the jugular vein is severed, whereupon the blood gushes forth, at first rapidly and then more slowly, the blood draining from the animal's body as it passes along suspended on the conveyor rail.

The blood which issues from the animal is valuable as a material since it is a very good source of albumen and can be made into many products. The dried material from blood is useful for setting dyes in textile manufacture, for finishing leather, as an ingredient in fungicide compositions and in plywood glues, and has many other industrial applications.

Previously the best practice for collecting the blood has been to use a number of men, each man being provided with a pail. An anti-coagulant solution, such as sodium citrate or ammonium oxylate, was placed in the empty pails and each man in turn attempted to get his bucket under an animal after it was stuck, holding the pail to catch the blood as the animal was passed along on the conveyor. The filled pails were then carried over and dumped into a vat where the blood was collected for subsequent processing.

The method of collecting blood by hand in pails, as just described, is objectionable for many reasons. Many times it is not possible for a man with a pail to position his pail quickly enough after the sticking operation to catch the first gush of blood, which usually is by far the largest. The manipulations are cumbersome and laborious, it being necessary to secure a measured quantity of anti-coagulant solution within the pail before catching the blood in it. At times the projecting front feet of the animal are moving or kicking so that this interferes with placing or holding the pail. Also it is necessary for the men to walk to and from the vat for each pail of blood, and the splashing of the blood on the sides of the pails and elsewhere altogether makes an unsatisfactory condition, especially where many men are trying to work in a space which must necessarily be quite small.

The difficulties involved in catching the blood in pails are so great that some packing houses do not attempt to catch the blood at all and none can by any means catch all of the blood drained from the animals. In most cases the blood is allowed to drain onto the killing floor of the slaughter house and be passed along with other waste to be made into fertilizer.

It would be very desirable to have a method and apparatus whereby the blood could be caught more efficiently than by the manual or pail method heretofore described. The blood which is now lost or passed to fertilizer would be of great value to industry if satisfactory means for collecting it were available so that this blood could be collected and processed for industrial uses.

An object of the present invention is the provision of a method and apparatus which will overcome the difficulties as above set forth in connection with the method previously used and which is superior to the prior methods in other ways.

Other specific objects of the invention contemplate the provision of a method and apparatus in which: the manual labor heretofore needed for the collection and treatment of blood is substantially eliminated; substantially all of the blood from each animal can be caught with little or no waste; foaming of the blood is also substantially reduced or eliminated; rupture of the blood corpuscles and subsequent escape of the hemoglobin into the plasma is greatly reduced; automatic proportioning and feeding of anti-coagulant controlled by the amount of blood flowing into the system is made possible; thorough mixing of the anti-coagulant with the blood is accomplished; and, yields of plasma as well as other constituents, far in excess of conventional practices, are brought about.

Other objects of the invention will in part be obvious and will in part appear hereinafter.

In carrying out the present invention, I prefer to provide a trough positioned on the killing floor so that the blood, draining from the animals passing along suspended on the conveyor rail, will fall directly into the trough. Associated with the trough is mixing means which is effective to intimately admix the fresh blood with anti-coagulant solution. Another feature is the use of automatic means for adding measured quantities of anticoagulant solution.

Since all cattle, for example, are not the same length, it is another feature of my invention to provide means for raising or lowering the position of the trough as may be desired, depending on the size of the animals being slaughtered.

Following is a detailed description of a procedure and apparatus which is an example of my invention. This detailed description may be understood in connection with the accompanying drawings in which:

Fig. 1 is a side elevational view, illustrating a preferred form of apparatus suitable for the collection and treatment of blood stationed on an upper floor and communicating with a proportionometer and associated storage tanks located on a lower floor;

Fig. 2 is an end elevational view of the collecting and mixing apparatus depicted in Fig. 1;

Fig. 3 is a plan view taken along the lines 3—3 of Fig. 2 and looking in the direction of the arrows;

Fig. 4 is a transverse side elevation partly in section and with parts broken away of the collecting trough and collecting mixing compartment of the apparatus taken along the lines 4—4 of Fig. 3 and looking in the direction of the arrows;

Fig. 5 is a sectional plan view of the mixing compartment taken along the lines 5—5 of Fig. 4 and looking in the direction of the arrows;

Fig. 6 is a view similar to Fig. 5 taken along the lines 6—6 of Fig. 4, also looking in the direction of the arrows;

Fig. 7 is a perspective view of the collecting and mixing compartment partly in section and with parts broken away;

Fig. 8 is a cross sectional view of a tank containing a horizontally rotatable group of buckets of a proportionometer in temporarily stationary position, one of the buckets continuously receiving a stream of blood preparatory to rotation; and Fig. 9 is a view similar to Fig. 8 illustrating the beginning of rotation of the rotatable buckets upon filling to actuate said proportionometer.

As illustrated, the trough 10 is provided for catching the freshly drained blood as it flows from the animal. This trough is suspended by any suitable means, such as a cable 54 associated with the top of a yoke 55 riding between an upright frame set on the killing floor and indicated generally at 53. One end of the cable is suitably secured to a stringer 56 connecting opposite ends of the uprights 53. Preferably the opposite end of the cable is connected to a motor-controlled winch 57 located on top of the stringer 56. This may be operated to cause the trough to rise and fall so as always to maintain the same at a point closely adjacent blood freshly draining from each carcass. In the illustration there is shown a push button control 58 which can be regulated by an attendant to accomplish this purpose.

As shown in Fig. 1, trough 10 is preferably carried in an inclined position so that the blood in it will flow by gravity toward one end. Secured to the edge of the trough nearest the animal is a horizontal rail 10a which aids in guiding the animals and maintaining them in proper position with respect to the trough as they pass therealong.

At the lower end of the trough 10 is a mixing compartment generally indicated at 11. This compartment preferably consists of at least two communicating upper and lower chambers 12 and 13 respectively. The upper chamber 12 has an entrance port 14 and a baffle plate or partition 15 abutting one end wall and perpendicular thereto but ending short of the opposite end wall of the chamber leaving an opening communicating with the remainder of the chamber which the baffle, as a partition, has provided. In this remaining portion of the chamber the floor is provided with a second entrance port 16 communicating with the lower chamber 13, which also is provided with a baffle or partition 17 similar to the baffle 15 in the upper chamber. This baffle 17 also falls short of an end wall 18 of the chamber and provides an opening communicating with the remaining portion of the lower chamber 13. In this remaining portion of the lower chamber is an exit port 19. It will also be observed that the end wall 18 has an opening 20 therein so that the end wall 18 also functions in part as a baffle plate. This permits blood in leaving the lower chamber to be separated into two streams, one of which passes through the opening 20 and the other through the exit 19. Overlying the exit 19 is a rectangularly shaped cover 21 having a single opening 22 therein. The use of this device while optional is strongly recommended since it functions ideally as a vortex inhibitor.

In the mixing operation there is a tendency for the blood to swirl, creating a vortex which draws air into the blood, and air in the recirculated portion of the blood is objectionable in that it produces foaming in trough 10. To alleviate this tendency I prefer to use the vortex inhibitor 21 which serves the function of breaking up any swirling patterns and producing a more continuous and uninterrupted flow of blood. The blood stream after it leaves the opening 20 similarly is in a state of turbulence and in order to alleviate this condition and to provide a smoother flow onward from this point, the blood is thrown against a weir or dam 23 which is of a height and area which will cause the blood first to fill the well behind it, causing it to rise to a position where it can only spill over the edge of the dam in a continuous sheet where it drops into an adjacent well indicated generally at 24 and out through an exit port 25.

The mixing compartment is constructed so that it may be readily cleaned, and the wall 70, which is the bottom of the rear portion of the trough 10, is releasably joined at 71 with the forward portion of the trough bottom. (See Fig. 4.) The wall 70 together with walls 72, 73, 74 and 18 and including partitions 15 and 17, are removable as one piece. With this piece removed the piece 21 can also be removed for cleaning.

The pump 26, illustrated, operates on well known principles, the rotation of the crescent 26a and sprocket 26b serving to draw the blood from its inlet communicating with the exit 19 and impelling the blood through its outlet which communicates with the tube 27. The clearances between the moving parts of the pump are relatively large so that the forces acting on the blood particles are mild. In this way rupture of blood corpuscles is held to a minimum. It is sufficient if the pump develop only about one or two pounds per square inch blood pressure at its outlet. A pump such as that illustrated which develops a continuous pressure is preferable and has been found to produce less injury to the blood than pumps such as the reciprocating type.

The anti-coagulant solution can be manually placed in the trough 10 as the operation proceeds, a measured quantity being introduced for every animal from which blood is taken, but it is preferable to use a device such as illustrated in the drawings whereby anti-coagulant solution is added in accordance with the amount of blood being treated. In the embodiment illustrated, the blood, after it leaves the well 24, is directed through a conduit 30 which communicates directly with a proportionometer.

More specifically the blood, after it leaves the well 24, is directed through a conduit 30 which communicates directly with a proportionometer indicated generally at 31 before it enters the storage tank 28. This proportionometer consists of a tank 32 having horizontally disposed therein a shaft 33 on which is mounted a plurality of buckets 34, six of these being illustrated in the accompanying drawings, although it will be understood any suitable number of divisions to provide a desired number of buckets may be utilized. Preferably, this horizontally disposed group of rotatable buckets is so mounted on a shaft vertically movable between the end walls of the tank 32 that the entire assembly is permitted to rise and fall a short distance during operation, the purpose of which will shortly be disclosed.

On the outside of the tank the shaft 33 is provided with a disk 35 having disposed thereon a number of lugs 36 commensurate in number with the number of buckets within the tank. Secured to the outside of the tank end wall is a projecting finger block 37 fixed in the path of each rotating projection or lug 36. Also mounted on this end of the shaft is a sprocket 38 with a chain 39 around a similar sprocket 40 mounted on the side wall of the tank 32. The sprocket 40 is associated with the shaft of a pneumatic cylinder (not shown) having inlet and outlet valves communicating, by means of pipes 41 and 42, with a similar cylinder 43 having a piston 44 on the floor above. This piston has a connecting rod which communicates with another cylinder 45 having a similar piston 46. The cylinder 45 itself is in pipe-line communication with a tank 47 containing a suitable anti-coagulant also on the killing floor above. Another portion of the cylinder 45 is in pipe-line communication with the rotary pump 26. This latter pipe-line extends from two outlets in the upper portion of the cylinder 45 through a flexible hose connection 48 upwardly through an observation glass 49 terminating in the pipe shown at 50 (see Figs. 1 and 4). In conjunction with the operation of the proportionometer a pipeline indicated generally at 51 is by-passed from the cylinder connecting the lower ends of the pipe-lines 41 and 42 adjacent the tank 32 through a flexible hose connection 52, the end of which overlies the collecting and mixing compartment 11. This arrangement bleeds off intermittent puffs of air whereby any foam collected at the end of the trough in the area of the compartment 11 is blown away from the apparatus to prevent foam from entering this compartment.

Instead of providing the cylinders 43 and 45 which introduce a measured amount of anti-coagulant as controlled by the movement of sprocket 40, this sprocket may be arranged to drive directly a pump which will deliver anti-coagulant to the circulating system. In such case, as in the structure illustrated, the amount of anti-coagulant delivered is controlled by the amount of blood recovered.

The anti-coagulant may be sodium citrate, ammonium oxylate or other salt which will react to remove free calcium from the blood. The effect of such agent is to prevent clotting or coagulation of the blood during certain of the subsequent processing operations.

The apparatus is first conditioned for operation by the addition of a suitable quantity of anti-coagulant solution in the trough 10. The amount of anti-coagulant so added will vary with the size of the apparatus but it is desirable that the solution be sufficient to wet all parts of the circulating system and to treat the blood received into the trough before any is spilled over the weir 23.

*Operation*

In the operation of the improved system stunned animals are passed on a conveyor suspended by their hind legs, and as each animal arrives at a point directly over one end of the trough 10 (the left-hand end as shown in Fig. 1) the neck of the animal is slit and the veins severed as described in connection with the prior practices, whereupon the blood spurts out into the trough. As shown more clearly in Fig. 2 of the drawings, the animal's forelegs project harmlessly over the trough and as the conveyor moves forward the neck of the carcass slides along the guard rail 10a, this rail serving to keep the carcass in proper position and prevent the head from getting over into the trough. By the time the carcass reaches the other end of the trough, substantially all the blood will have been drained from it.

The first blood which is caught by trough 10 serves only to build up the circulating system. It mixes with the anti-coagulant which was initially introduced and passes from the trough to the mixing compartment, to the pump, and back again to the trough.

With the initial blood circulating in the system, the blood flowing from the animal's throat into the trough contacts a stream of mixed blood and anti-coagulant and passes with the stream down the inclined trough. The combined liquids pass through the port 14 of the upper chamber 12, around the baffle 15 to the other portion of the upper chamber where they enter the port 16 to the lower chamber 13 where they are further baffled by the partition 17 and end wall 18. The mixture is then directed between these partitions to the remaining portion of the lower chamber and this arrangement causes the blood to separate and flow in two opposite directions. One portion thereof enters the opening 22 of the vortex inhibitor flowing therebeneath and through the outlet 19 into the rotary pump 26. The other portion, which represents the excess over the amount required for circulation through the apparatus, flows through the opening 20 filling up the well in the area on the other side of the wall 18 and spills over the weir 23. This weir serves the function of maintaining a sufficient and substantially constant amount of blood in the circulating system and also serves to smooth out the flow of excess blood which is withdrawn from the circulating system. The withdrawn blood which overflows weir 23 enters the well 24, flows through the exit 25, and through the conduit 30.

From conduit 30 the blood is directed to the buckets 34 of the proportionometer and after a given amount is captured the weight of blood first carries the entire rotatable bucket assembly vertically downwardly as permitted by the manner in which each end of the shaft 33 is journalled, which is a distance at least equal to the length of one of the lugs 36. At the lowermost position of the shaft the particular lug abutting the finger on the block 37 is released and the buckets are turned in a counterclockwise direction to be emptied of their contents. The assembly is then again permitted to rise so that the next succeeding lug is brought against the projecting finger on the block 37. The average amount of blood from a beef creature, for example, is about 2 gallons and weighs approximately 20 pounds. By controlling the operation of the buckets by the weight or amount of blood which enters the proportionometer a desired quantity of an anti-coagulant, such as sodium citrate solution, can be injected into the blood at another point in the system. Lesser amounts of blood can readily be made to operate the rotatable buckets of the proportionometer as heretofore described merely by the provision of some suitable counterweight as indicated in Fig. 1 of the drawings. It will be noted that each filling and emptying of each bucket causes a step-by-step rotation of the shaft 33. Consequently the gear and sprocket arrangement 38—40 causes a similar movement of the pistons 44 and 46 in the cylinders 43 and 45 through the pipe-line communications 41 and 42.

As heretofore indicated, the cylinder 43 is under air compression and the cylinder 45 contains the desired anti-coagulant which is fed from the tank 47. The step-by-step movement translated to the piston 44 causes the same by the opening and closing of suitable inlet and outlet valves (not shown) periodically to transfer its motion to the piston 46 and at each backward and forward horizontal movement of this piston the necessary predetermined amounts of anti-coagulant, based on the proportionate amounts of blood entering the proportionometer, are passed successively through the flexible hose connection 48, the observation glass 49 and through the pipe 50 into the rotary pump 26. At this point the blood leaving the lower chamber 13 through the exit 19 and entering the pump is met by the anti-coagulant and intimate mixing thereof begins immediately. The pump 26 may be a conventional form of rotary pump but the one illustrated is well adapted to carry the blood in mixed condition continuously and evenly through the conduit 27 where mixed blood is fed into the opposite end of the trough 10. Freshly drained blood from the slaughtered animals is immediately intermingled and mixed with blood which has already been mixed with anti-coagulant in a similar treatment. All of the treated blood which enters the pump is constantly returned to an initial draining point of the trough to intercept freshly drain blood. It is important that the blood being recirculated by pump 26 through trough 10 have the anti-coagulant thoroughly mixed within it, and it is also important that the fresh blood have opportunity to be thoroughly admixed with this mixture before any product is drawn off. These features are attained through the provision of the system where the fresh blood is intimately admixed in the mixing compartment 11 with the previously circulated blood and anti-coagulant mixture. After mixing in this compartment 11, a portion of the resulting product, representing the excess over the normal circulating volume, is withdrawn from the circulating system through conduit 30 and the remainder is passed through the circulating pump, the anti-coagulant being introduced to the blood circuit at the pump or between the point of the product withdrawal and the pump. I have found that better results are obtained if the anti-coagulant is introduced to the blood circulating circuit in this way, so that the pump serves to mix the added anti-coagulant with the blood being recirculated. Then the fresh blood falling into the trough becomes admixed with this stream and is thoroughly intermixed while passing through the mixing compartment 11 before the treated blood is withdrawn through the line 30.

The blood which overflows the weir is that portion which controls the operation of the proportionometer and this blood after performing this function is immediately accumulated in the storage tank provided therefor.

When the size of the animals being slaughtered changes to any substantial degree, the height of trough 10 can be changed by manipulating the control 58. This control may comprise two buttons, one of which may be depressed to produce upward movement and the other of which may be depressed to produce downward movement of the trough and its accompanying mechanism. When the length of the cattle, for example, is shorter, the attendant may depress the button for elevating the trough, and when the length of the cattle is longer, the other button may be depressed to lower the trough. By providing for adjustment of the height of the trough, the wound in the animal's neck may be always just above the trough, and the likelihood of the animal's head getting into the trough is largely avoided. It is important that the head not get over the rail 10a since but a small quantity of spew from the animal's mouth, being acid would spoil a large quantity of the blood product. When no more blood is being drained into trough 10, the flow of blood over weir 23 ceases, no more blood is delivered to the proportionometer, and no further anti-coagulant solution is delivered to the pump. The normal circulating volume, however, remains in the system and continues to be pumped about the circuit. The amount of circulating blood may be varied as desired, and in one installation I have found a volume of about seven gallons to be satisfactory.

At the end of the day, or when slaughtering ceases, the pump may be stopped, and substantially all the blood in the circuit then drains from the apparatus.

It is another feature of the improved apparatus that it may be readily cleaned after use. Conveniently the valve 60 may be opened and the apparatus flushed out with water, the discharge from valve 60 spilling onto the killing floor and draining away as waste. As previously explained, portions of the mixing compartment may be easily removed for cleaning.

The trough 10 may be of any desired length, and it will be observed that the blood of several animals may be draining into the trough at the same time.

It will thus be seen that the objects hereinbefore set forth may readily and efficiently be attained and since certain changes in carrying out the above process and in the constructions set forth which embody the invention may be made without departing from its scope, it is intended that all matter contained in the above description or shown in the accompanying drawings shall be interpreted as illustrative and not in a limiting sense.

It is also to be understood that the following claims are intended to cover the generic and specific features of the invention herein described, and all statements of the scope of the invention which, as a matter of language, might be said to fall therebetween.

Having described my invention, what I claim as new and desire to secure by Letters Patent is:

1. An apparatus for the collection and treatment of blood, which comprises in combination, a downwardly inclined trough for continuously capturing freshly drained blood from slaughtered animals traveling along said trough, and means, including a mixing chamber, cooperatively associated with one end of said trough whereby said blood is collected and intimately mixed with an anti-coagulant preparatory to further treatment thereof, said trough being supported by a standard and means to cause the same to be raised and lowered to accommodate animals of varying sizes to maintain the point of drainage closely adjacent said trough to minimize splashing, foaming and loss of blood.

2. An apparatus for the collection and treatment of blood, which comprises in combination, means to capture freshly drained blood from slaughtered animals, means associated with said first named means to intimately mix said blood with an anti-coagulant preparatory to further treatment thereof, means to introduce a measured quantity of said anti-coagulant into said drained blood, said last mentioned means being operated when there is a predetermined collected amount of said blood, and means including a circulating pump to separate a portion of said mixed blood and to return it to an initial point in said first named means to be intermingled with said freshly drained blood.

3. An apparatus for the collection and treatment of blood, which comprises in combination, means to capture freshly drained blood from slaughtered animals, means, including a mixing compartment having a drainage well, cooperatively associated with said first named means whereby said blood intimately is mixed with an anti-coagulant preparatory to further treatment thereof, means to introduce a measured quantity of an anti-coagulant into said blood, means to control said last mentioned means in accordance with the amount of blood collected, means to separate and return a portion of said mixed blood to an initial point of said first named means to be intermingled with said freshly drained blood, and a conduit connected to said drainage well to route the remaining portion of said mixed blood to said means to control the quantity of said anti-coagulant introduced into said blood.

4. An apparatus of the class described, comprising in combination a trough for continuously catching freshly drained blood from slaughtered animals, a collecting and mixing compartment at one end thereof, a proportionometer operatively responsive to a predetermined quantity of blood collected in said compartment and flowing thereto, and means including a measuring device operated by said proportionometer to measure out a given quantity of an anti-coagulant proportionate to said predetermined quantity of blood and to introduce the same into said mixing compartment with blood intimately to be mixed therewith.

5. An apparatus of the class described, comprising in combination a trough for continuously catching freshly drained blood from slaughtered animals, a collecting and mixing compartment at one end thereof, a proportionometer operatively responsive to a predetermined quantity of blood collected in said compartment, and means including a measuring device operated by said proportionometer to measure out a given quantity of an anti-coagulant proportionate to said predetermined quantity of blood and to introduce the same into said blood intimately to be mixed therewith in said mixing compartment, said collecting and mixing compartment consisting of a plurality of intercommunicating chambers, one of said chambers having an outlet connected with said proportionometer and another outlet connected to the other end of said trough, and means including a pump for circulating said blood in said chambers and said trough.

6. An apparatus of the class described, comprising in combination a trough for continuously catching freshly drained blood from slaughtered animals, a collecting and mixing compartment at one end thereof, a proportionometer operatively responsive to a predetermined quantity of blood collected in said compartment, and means including a measuring device operated by said proportionometer to measure out a given quantity of an anti-coagulant proportionate to said predetermined quantity of blood and to introduce the same into said blood intimately to be mixed therewith in said collecting and mixing compartment, said collecting and mixing compartment consisting of a plurality of intercommunicating chambers, each of which has a mixing baffle therein, one of said baffles permitting a portion of blood to pass to said proportionometer and permitting the remaining portion of said blood to be returned to the other end of said trough, and means including a pump for circulating said blood in said chambers and said trough.

7. An apparatus of the class described, comprising in combination a trough for continuously catching freshly drained blood from slaughtered animals, a collecting and mixing compartment at one end thereof, a proportionometer operatively responsive to a predetermined quantity of blood collected in said compartment, and means including a measuring device operated by said proportionometer to measure out a given quantity of an anti-coagulant proportionate to said predetermined quantity of blood and to introduce the same into said blood intimately to be mixed therewith in said collecting and mixing compartment, said collecting and mixing compartment consisting of a plurality of intercommunicating chambers, one of said chambers having an outlet connected with said proportionometer, and a weir separating said outlet from said chamber whereby said blood is introduced steadily and continuously to said proportionometer.

8. An apparatus of the class described, comprising in combination a trough for continuously catching freshly drained blood from slaughtered animals, a collecting and mixing compartment at one end thereof, a proportionometer operatively responsive to a predetermined quantity of blood collected in said compartment, and means including a measuring device operated by said proportionometer to measure out a given quantity of an anti-coagulant proportionate to said predetermined quantity of blood and to introduce the same into said blood intimately to be mixed therewith in said collecting and mixing compartment, said collecting and mixing compartment consisting of a plurality of intercommunicating chambers, one of said chambers having an outlet connected with the other end of said trough, and a vortex inhibitor separating said outlet from said chamber whereby said blood steadily and continuously is intermingled with said anti-coagulant.

9. An apparatus of the class described, comprising in combination a trough for continuously catching freshly drained blood from slaughtered animals, a collecting and mixing compartment at one end thereof, a proportionometer operatively responsive to a predetermined quantity of blood collected in said compartment, and means including a measuring device operated by said proportionometer to measure out a given quantity of an anti-coagulant proportionate to said predetermined quantity of blood and to introduce the same into said blood intimately to be mixed therewith in said collecting and mixing compartment, and a foam-removing device operated by said proportionometer disposed above said collecting and mixing compartment adapted to prevent foaming blood to enter said compartment.

10. In an apparatus for the collection and treatment of freshly drained blood from slaughtered animals, the improvement which comprises an elongated trough, a standard by which said trough is supported, and means adapted to cause said trough to be raised and lowered to accommodate varying sizes of animals and in which said trough is substantially continuously maintained adjacent the draining area in the carcass of each of said animals.

11. In an apparatus for the collection and treatment of blood from freshly slaughtered animals, the combination of improvements comprising a collecting and mixing compartment having intercommunicating chambers provided by walls having openings therein, one of said chambers having on outlet controlling the flow of a portion of the blood, means operated by the flow of said portion of the blood to regulate the amount and flow of an anti-coagulant to other portions of said blood, another of said chambers having an outlet controlling the flow of remaining portions of said blood, and means to circulate said remaining portions of said blood whereby blood intermingled with anti-coagulants is mixed with unmixed and freshly drained blood.

12. In an apparatus for the collection and treatment of blood freshly drained from slaughtered animals, the improvement which comprises a collecting and mixing compartment having intercommunicating chambers, one of said chambers having a weir adapted to impede turbulence and cause said blood to flow continuously and uninterruptedly from said chamber.

13. In an apparatus for the collection and treatment of blood freshly drained from slaughtered animals, the improvement which comprises a collecting and mixing compartment having inter-communicating chambers, one of said chambers having a vortex inhibitor adapted to cause said blood to flow smoothly and continuously from said chamber.

14. In an apparatus for the collection and treatment of blood freshly drained from slaughtered animals, the combination of improvements which comprises a collecting and mixing compartment having intercommunicating chambers, one of said chambers containing a weir adapted to cause said blood to flow smoothly and continuously from one area of said chamber and a vortex inhibitor adapted similarly to control the flow of said blood from another area of said chamber.

15. In an apparatus of the class described, a mixing chamber for continuously receiving blood, means in said chamber for separating into two streams the blood received, a proportionometer consisting of a plurality of rotatable buckets actuable by predetermined amounts of blood received from one of said streams in a step-by-step movement, and means including a measuring device actuated by said proportionometer to inject proportionate amounts of anti-coagulant based on said predetermined amounts of blood into blood flowing in said other stream through said apparatus.

16. In an apparatus of the class described, the combination of a collecting and mixing compartment having intercommunicating chambers, a proportionometer, said mixing compartment controlling the flow of blood therefrom in proportionate amounts, means for causing said blood to flow through said mixing compartment and means whereby said proportionometer is actuated by predetermined amounts of blood.

17. A method of collecting and treating blood, which comprises in combination, continuously collecting blood from slaughtered animals, intimately mixing said blood with an anti-coagulant, and re-routing a portion of said mixed blood to an initial point of collection and intermingling the same with freshly collected blood.

18. A method of collecting and treating blood, which comprises in combination, continuously collecting blood from slaughtered animals, intimately mixing said blood with an anti-coagulant, re-routing a portion of said mixed blood to an initial point of collection and intermingling the same with freshly collected blood, and utilizing remaining portions of said mixed blood to control the amount of anti-coagulant to be injected into said blood being collected.

19. A method of collecting and treating blood, which comprises in combination, passing slaughtered animals from which blood freshly is being drained continuously adjacent a collecting trough, collecting and mixing said blood and at the end of said trough collecting the same in a mixing compartment, intimately mixing an anti-coagulant with said blood as it leaves said compartment and returning a portion of the mixed blood continuously to the initial point of collection, and intimately mixing said mixed blood with freshly drained blood.

20. A method of collecting and treating blood, which comprises in combination, passing slaughtered animals from which blood freshly is being drained continuously adjacent a collecting trough, collecting and mixing said blood and at the end of said trough collecting the same in a mixing compartment, intimately mixing an anti-coagulant with said blood as it leaves said compartment and returning a portion of the mixed blood continuously to an initial point of collection, intimately mixing said mixed blood with freshly drained blood, and utilizing a remaining portion of mixed blood continuously to control the amount of anti-coagulant to be mixed with remaining portions of said blood.

21. In a process of the type described, the combination of steps comprising continuously and uninterruptedly circulating blood previously treated with an anti-coagulant along a collecting trough, and substantially continuously draining blood from slaughtered animals into said treated blood in said trough, adding additional anti-coagulant to the circulating blood in proportion to the amount of freshly drained blood added to said circulating blood and removing and collecting the excess of treated blood over a predetermined amount of the same.

22. In a process of the type described, the combination of steps which comprises substantially continuously adding an anti-coagulant to a portion of blood flowing from a collecting and mixing compartment and controlling the rate of addition by a remaining portion of blood continuously flowing from another section of said compartment.

23. In an apparatus for the collection and treatment of blood drained from slaughtered animals, a trough for catching the blood as it drains from the animals, means for recirculating the blood along said trough, said means including a pump, means for withdrawing blood material from the blood circuit at a point between the point of collection in the trough and said pump, and means for introducing an anti-coagulant solution into the blood circuit between said point of withdrawal and the outlet of said pump.

24. Apparatus as called for in claim 23 which includes baffle means for admixing the liquids in the blood circuit between the point of blood collection in the trough and said point of withdrawal.

25. An apparatus for the collection and treatment of blood, which comprises in combination, means to capture freshly drained blood from slaughtered animals, means to add an anti-coagulant to said blood and means including a mixing device for receiving said blood and said anti-coagulant and for intimately mixing said blood and said anti-coagulant.

26. An apparatus for the collection and treatment of blood, which comprises in combination, means to substantially continuously capture freshly drained blood from slaughtered animals traversing the length of said means, means to add an anti-coagulant to said blood and means including a mixing device associated with said first named means for receiving said blood and said anti-coagulant and for intimately mixing said blood and said anti-coagulant.

27. An apparatus for the collection and treatment of blood, a trough for continuously capturing freshly drained blood from slaughtered animals traveling adjacent said trough, means to add an anti-coagulant to said blood and means including a mixing device at one end of said trough for receiving said blood and said anti-coagulant and for intimately mixing said blood and said anti-coagulant.

28. An apparatus for the collection and treatment of blood, which comprises in combination, means to capture freshly drained blood from slaughtered animals, means to add an anti-coagulant to said blood, means including a mixing device connected to said first mentioned means for receiving and intimately mixing said blood and said anti-coagulant, means for separating a portion of said mixed blood and anti-coagulant and means for circulating said portion including delivering said portion to said first mentioned means to be intermingled with said freshly drained blood.

29. An apparatus for the collection and treatment of blood, which comprises in combination, means to capture freshly drained blood from slaughtered animals, means including a proportionometer for introducing a measured quantity of an anti-coagulant into said blood, means including a mixing device for receiving said blood and said anti-coagulant and for intimately mixing said blood and said anti-coagulant and means operating said proportionometer in accordance with a predetermined collected amount of said blood.

30. An apparatus for the collection and treatment of blood which comprises, in combination, means to capture freshly drained blood from slaughtered animals, means controlled by the amount of blood captured to introduce a measured quantity of an anti-coagulant into said blood, means including a mixing compartment for intimately mixing said blood and said anti-coagulant and means for separating a portion of said mixed blood and anti-coagulant and circulating said portion back to said first mentioned means to be intermingled with said freshly drained blood.

31. In an apparatus for the collection and treatment of blood from freshly slaughtered animals, the improvement which comprises a collecting and mixing compartment having intercommunicating chambers provided by walls having openings therein controlling the flow of blood from said mixing chambers, and means operated by blood flowing from said mixing chambers for intermingling measured amounts of anti-coagulant with said blood, the flow of blood to said last mentioned means being controlled by one of said walls.

BERTIE S. HARRINGTON.

REFERENCES CITED

The following references are of record in the file of this patent:

UNITED STATES PATENTS

| Number | Name | Date |
|---|---|---|
| 930,772 | Lincoln | Aug. 10, 1909 |
| 2,249,792 | Skinner | July 22, 1941 |
| 1,703,730 | Fraisse | Feb. 26, 1929 |
| 1,861,307 | Gernhardt | May 31, 1932 |
| 2,193,717 | Faust et al. | Mar. 12, 1940 |
| 1,146,589 | Morrison | July 13, 1915 |
| 1,428,672 | Wilson | Sept. 12, 1922 |
| 1,804,042 | Westcott | May 5, 1931 |
| 1,226,598 | Roberts | May 15, 1917 |